US006364276B1

(12) United States Patent
Polzin et al.

(10) Patent No.: US 6,364,276 B1
(45) Date of Patent: Apr. 2, 2002

(54) FOUNTAIN, KIT, BRACKET AND METHOD OF ASSEMBLY

(76) Inventors: Deirdre Polzin; Joseph J. Polzin, both of 30460 Cabrillo Ave., Temecula, CA (US) 92591

( * ) Notice: Subject to any disclaimer, the term of this patent is extended or adjusted under 35 U.S.C. 154(b) by 0 days.

(21) Appl. No.: 09/470,920

(22) Filed: Dec. 23, 1999

Related U.S. Application Data

(62) Division of application No. 09/112,515, filed on Jul. 9, 1998, now Pat. No. 6,053,422.
(60) Provisional application No. 60/052,932, filed on Jul. 12, 1997.

(51) Int. Cl.[7] .......................... F16M 1/00; F16M 11/00; F16M 3/00; F16M 5/00; F16M 7/00
(52) U.S. Cl. ....................................... 248/674; 248/200
(58) Field of Search ................................ 248/637, 674, 248/200, 213.2, 225.11, 500; 239/17

(56) References Cited

U.S. PATENT DOCUMENTS 2,651,483 A * 9/1953 Ritchie et al. .............. 248/500
3,916,477 A * 11/1975 Baker, Sr. ................... 248/200
4,097,012 A * 6/1978 McIntyre .................... 248/674
4,514,105 A * 4/1985 Adams et al. .............. 248/637
4,836,497 A * 6/1989 Beeson ........................ 248/674
5,332,188 A * 7/1994 Davis et al. ................ 248/674
5,511,750 A * 4/1996 Evenson ..................... 248/200
6,053,422 A * 4/2000 Polzin, Jr. et al. ............ 239/17

* cited by examiner

*Primary Examiner*—Ramon O. Ramirez
*Assistant Examiner*—J. DeLuca
(74) *Attorney, Agent, or Firm*—John J. Connors; Connors & Associates

(57) ABSTRACT

A fountain includes a container having a top with an opening therein, a bottom, and an interior for holding a liquid, such as water. An elongated, hollow support member is positioned within the interior and extending from the opening in the top. This support member has a first end mounted at or near the bottom of the container, a second end terminating a predetermined distance above the opening in the top, and an exterior surface over which liquid flows. A pump positioned within the interior and operably connected to the first end of the support member pumps liquid in the interior into and through the hollow support member to flow out its second end and then along the exterior surface of the support member to return to the interior of the container. A faucet is attached to the second end of the support member in a manner which allows the liquid to flow from the second end.

4 Claims, 8 Drawing Sheets

FIG. 4A
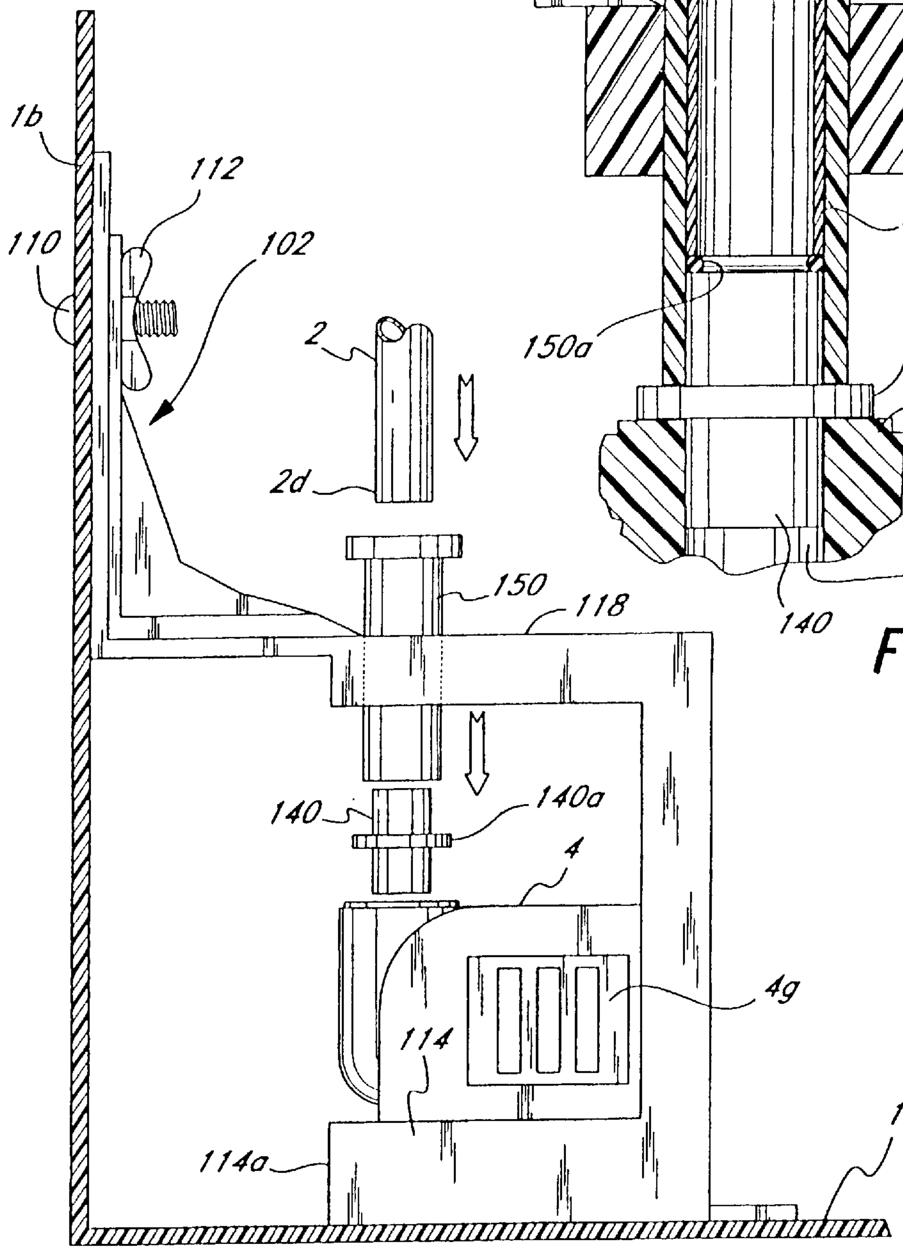
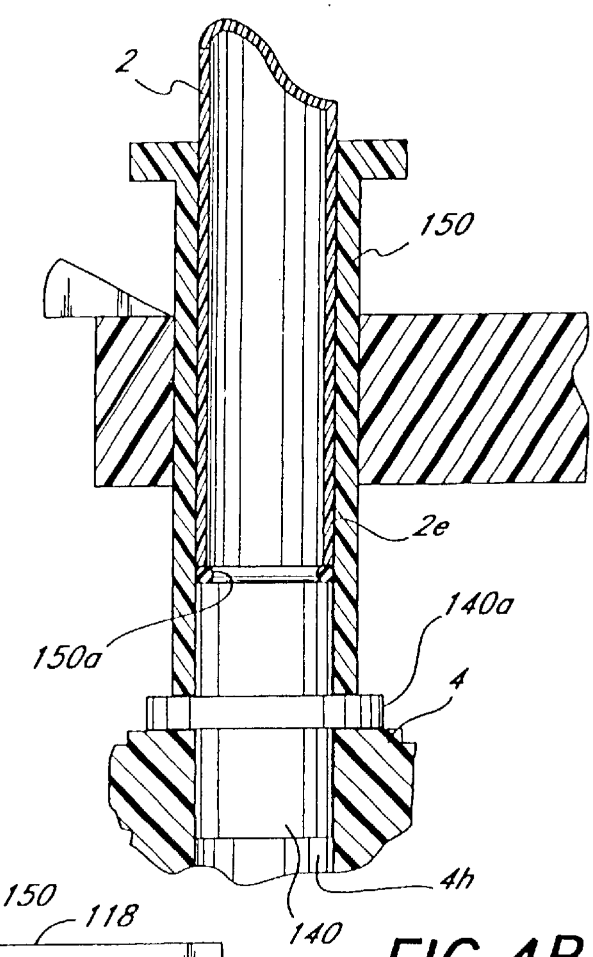
FIG. 4B

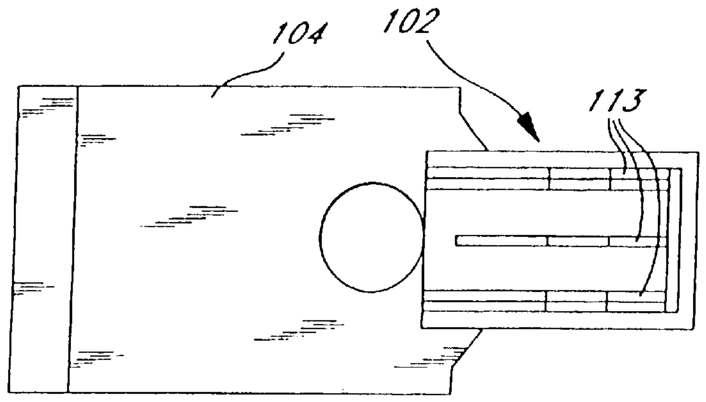
FIG. 8
FIG. 7
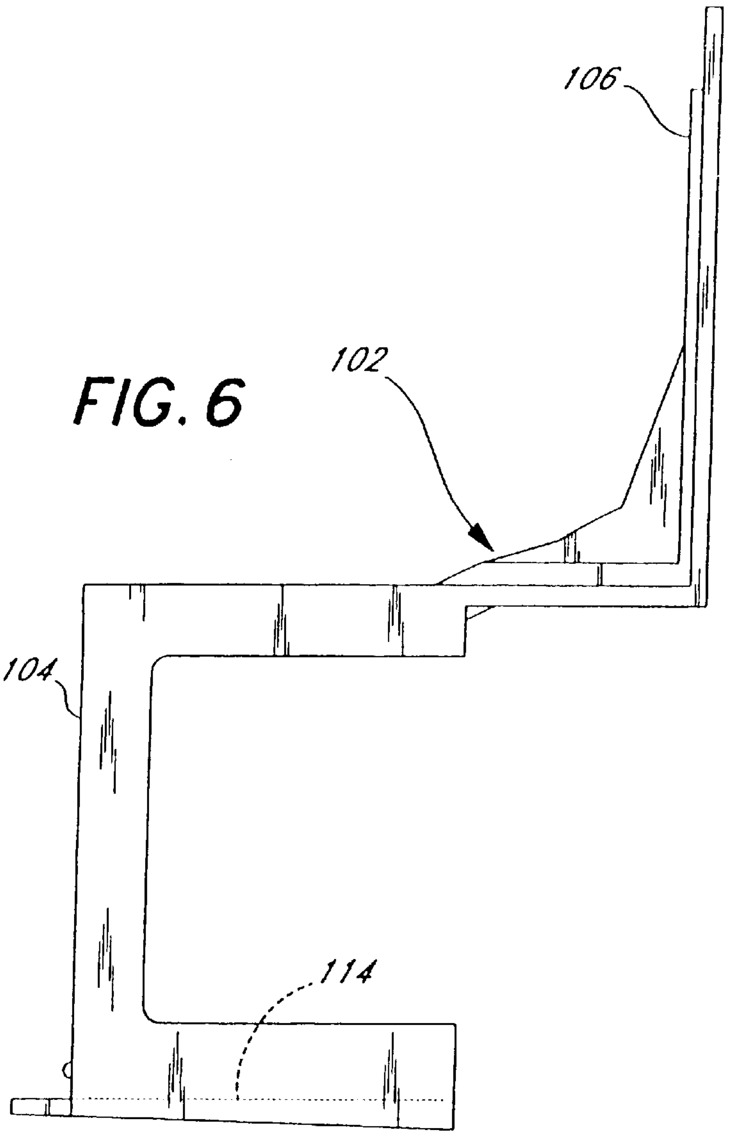
FIG. 6
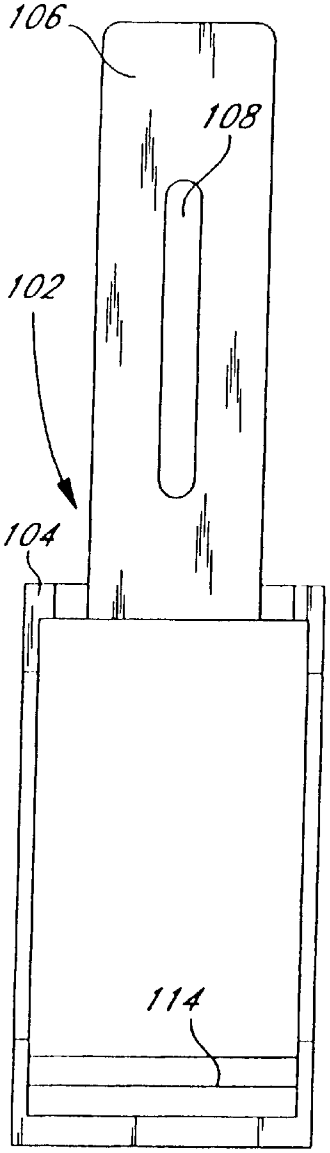

FOUNTAIN, KIT, BRACKET AND METHOD OF ASSEMBLY

RELATED PATENT APPLICATIONS

This application is a divisional patent application of U.S. Ser. No. 09/112,515, filed Jul. 9, 1998, entitled, "Fountain, Kit, Bracket And Method Of Assembly," now U.S. Pat. No. 6,053,422, which in turn is a utility patent application based on provisional application U.S. Ser. No. 60/052,932, entitled "NOVEL FOUNTAIN," filed Jul. 12, 1997, which is incorporated herein by reference and made a part of this application.

BACKGROUND OF THE INVENTION

1. Field of the Invention

This invention relates to a water fountain which creates an illusion of a faucet floating in mid-air with a stream of water flowing from the faucet into a water container. Optionally, the illusion is further enhanced by the presence of a statuette of a bird hovering at this stream of flowing water and sipping from it.

2. Background Discussion

Water fountains are common, and usually employ pumps to pump water, typically through holes in statues, for example, from the mouth of a fish or other animal. These fountains can be very expensive and beyond the financial resources of an average household. It would be very desirable to provide an affordable fountain that has some or all of its components in a kit which enable the user to easily assemble these components into the fountain. Moreover, it would be desirable to provide a fountain with a unique optical or visual effect and that is rugged, attractive, distinctive, and would be suitable for indoor or outdoor use.

SUMMARY OF THE INVENTION

This invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENTS," one will understand how the features of this invention provide its benefits, which include, but are not limited to, a fountain which is affordable, easy to assemble fountain, and is rugged, attractive, distinctive, and would be suitable for indoor or outdoor use. Alternately, some or all of the components of the fountain come in a kit for assembly by the user.

The first feature of the fountain of this invention is that it includes a container having a top with an opening therein, a bottom, and an interior for holding a liquid, such as water. Typically, a conventional, metal watering can is suitable, although other containers such as, for example, wishing wells, buckets, tubs, etc. may be used.

The second feature is an elongated, hollow support member positioned within the interior of the container and extending from the opening in the top of the container. This support member has a first end mounted at or near the bottom of the container, a second end terminating a predetermined distance above the opening in the top, and an exterior surface over which liquid flows. The predetermined distance the second end of the support member terminates above the open top is from about 2.5 to about 8.5 inches. The support member has a tubular configuration and is made of a transparent or translucent material. Preferably, the opening in the top of the container has a central point laterally displaced with respect to a longitudinal axis of the container, and the support member intersects with this central point and is substantially parallel to the longitudinal axis of the container.

The third feature is a pump positioned within the interior and operably connected to the first end of the support member, so that liquid in the interior is pumped into and through the hollow support member to flow out its second end and then along the exterior surface of the support member to return to the interior of the container. Preferably, the pump is suspended above the bottom of the container, but below the opening in the top. A bracket member attached to the side wall of the container may be used to support the pump. This bracket has a base that is at or near the bottom of the container. When the bracket is attached to the container, preferably, the base is elevated above the bottom of the container. The inlet for the pump is below the opening in the top and below a nominal level of liquid to be poured into the container. The distance above the bottom is such that the inlet for the pump is above the bottom of the container at least about 1/16 inch, preferably from about 1/8 to about 1/2 inch. The interior of the container is at least partially filled with liquid sufficient to cover the pump so that the pump will not run in a dry state, and the pump may have at least one suction cup which engages the base of the bracket member.

The forth feature is that the bracket includes a substantially L-shaped arm connected to and offset from a substantially U-shaped support member. The L-shaped arm has a first leg with an elongated opening therein for a fastener that attaches the bracket to the container and a second leg substantially at a right angle to the first leg which terminates at a connecting portion. The U-shaped support member has a first arm with an opening therein for the tubular support member which terminates in a connecting section that is integral with the connecting portion of the second leg of the L-shaped arm. A second arm of the U-shaped support member is adapted to support the submersible pump, and a bridge member connects the first and second arms. Preferably, the bridge member is open, and preferably, there is at least one reinforcing element extending between and connected to the first leg of the L-shaped arm and the first arm of the U-shaped support member.

The fifth feature is a statuette of a bird with a beak connected to the support member at a portion of the support member extending from the opening in the top. The use of the statuette is optional. This statuette is from about 2.5 to about 3.5 inches in length and is light weight, having a weight of from about 1/4 to about 3/4 ounces. Optionally, a statuette of an insect may be attached to an exterior surface of the container, for example, by fabric and hook fasteners, or glued.

The sixth feature is a faucet attached to the second end of the support member in a manner which allows the liquid to flow from the second end. This provide the illusion of water flowing from faucet suspended in mid-air.

This invention also includes a do it yourself kit which comprises a package holding the following components of the fountain which are to be manually assembled by a user along with other components purchased elsewhere:

(a) an elongated, light transmitting, hollow tubular support member adapted to be positioned with a first portion extending into an interior of a container and terminating at a first end and a second portion extending from an opening in a top of the container and terminating at a second end, and (b) a bracket member for supporting a submersible pump which is adapted to be attached to the side wall of the container. Optionally, this kit may include other components of the fountain along with instructions for assembly. However, the kit with the bracket and the support member is all that is needed, because the user can easily purchase the other components of the fountain such as the container, pump, and faucet, and assemble these with the bracket and support member.

This invention also includes a method of making a fountain. This method includes:

providing a container having a top with an opening therein, a bottom, and an interior for holding a liquid, providing an elongated, hollow support member having a first end, a second end, and an exterior surface, providing a pump and positioning said pump within the interior of the container and operably connecting the first end of the support member to the pump with said second end extending from the opening in the top, so that liquid in the interior of the container, upon operation of the pump, will be pumped into and through said hollow support member to flow out its second end and then along the exterior surface of the support member to return to the interior of the container, and providing a faucet and attaching said faucet to the second end of the support member in a manner which allows the liquid to flow from said second end.

DESCRIPTION OF THE DRAWING

The preferred embodiments of this invention, illustrating all its features, will now be discussed in detail. These embodiments depict the novel and non-obvious fountain of this invention as shown in the accompanying drawing, which is for illustrative purposes only. This drawing includes the following figures (FIGS.), with like numerals indicating like parts:

FIG. 4A is a side elevational view of the bracket attached to the side wall of the water container used in the second embodiment of the novel fountain of this invention shown in FIG. 3.

FIG. 4B is a view, partially in cross-sectional, of the assembly of the tube, adapter and coupling pipe.

FIG. 6 is a side elevational view of the bracket used in the second embodiment of the novel fountain of this invention.

FIG. 7 front view of the bracket used in the second embodiment of the novel fountain of this invention.

FIG. 8 is a top view of the bracket used in the second embodiment of the novel fountain of this invention.

DESCRIPTION OF THE PREFERRED EMBODIMENTS

First Embodiment

Figure 1:
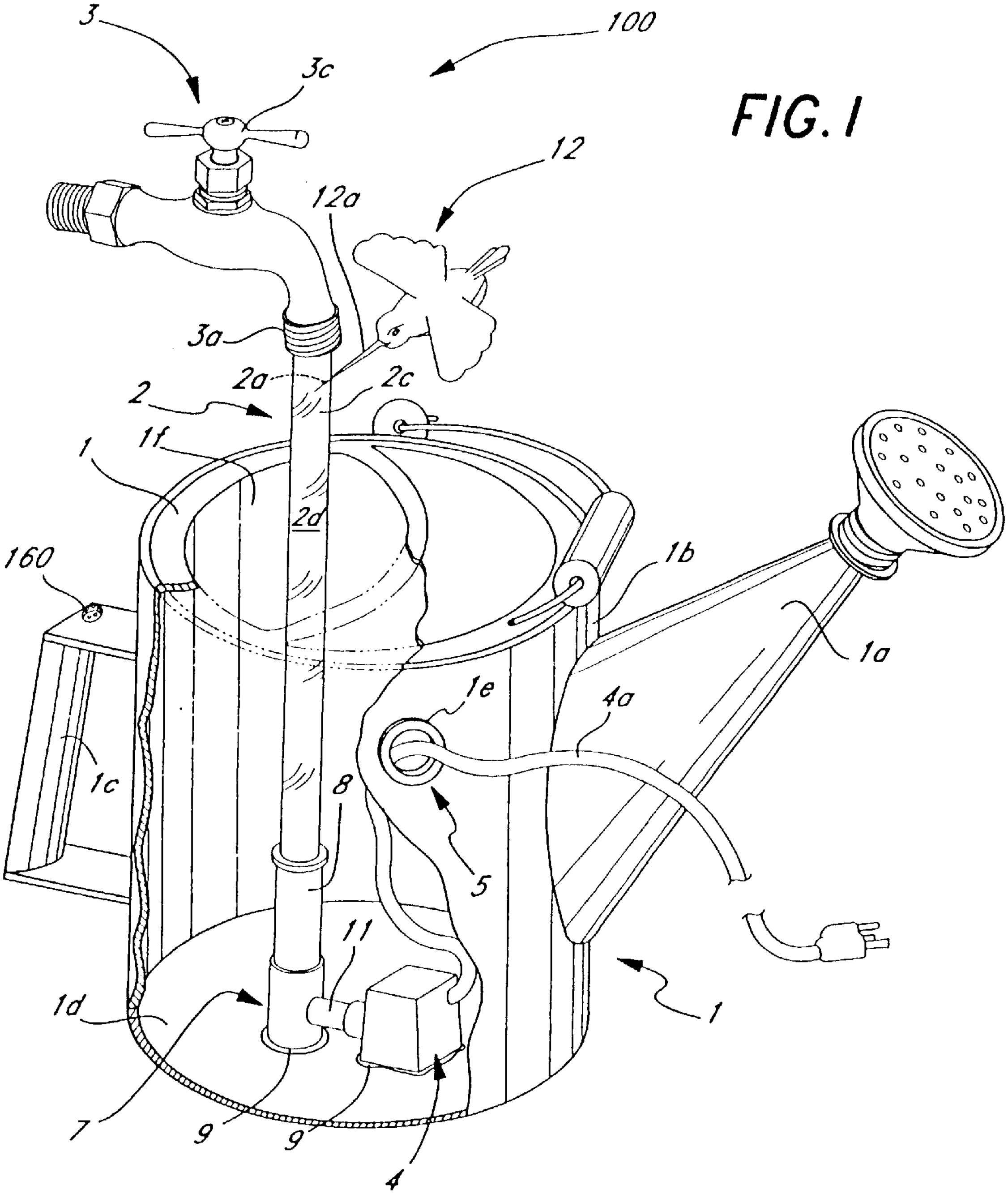
FIG. 1 is a perspective view, with sections broken away, of the first embodiment of the novel fountain of this invention.

As shown in FIG. 1, the fountain 100 of this invention includes the water container 1, a pump 4 at the bottom 1*d* of the container, and a transparent, rigid plastic tube 2 having a faucet 3 attached to a free end 2*c* of the tube which extends above an opening 1*f* in the top of the container. The tube 2 serves as a support member for the faucet 3. Preferably, the container 1 is a conventional metal watering can having a spout 1*a,* and on the side wall 1*b* of the container opposite the spout, a handle 1*c*. The pump 4 is of the submersible type such as sold by Aquarium Systems, Inc., and it is secured in position to the bottom 1*d* with an epoxy adhesive 9. A rubber grommet 5 is placed a hole 1*e* drilled in the side wall 1*b* of water container 1 and an electric power cord 4*a* for the pump 4 and pulled through the grommet. One end of a PVC polyvinyl chloride pipe 6 is attached and fastened with glue to an outlet 11 of the pump 4. Connected and fastened with glue to the other end of the pipe 6 is an elbow 7. The elbow 7 is fixed to the bottom 1*d* of the container 1 with epoxy adhesive 9

Figure 2:
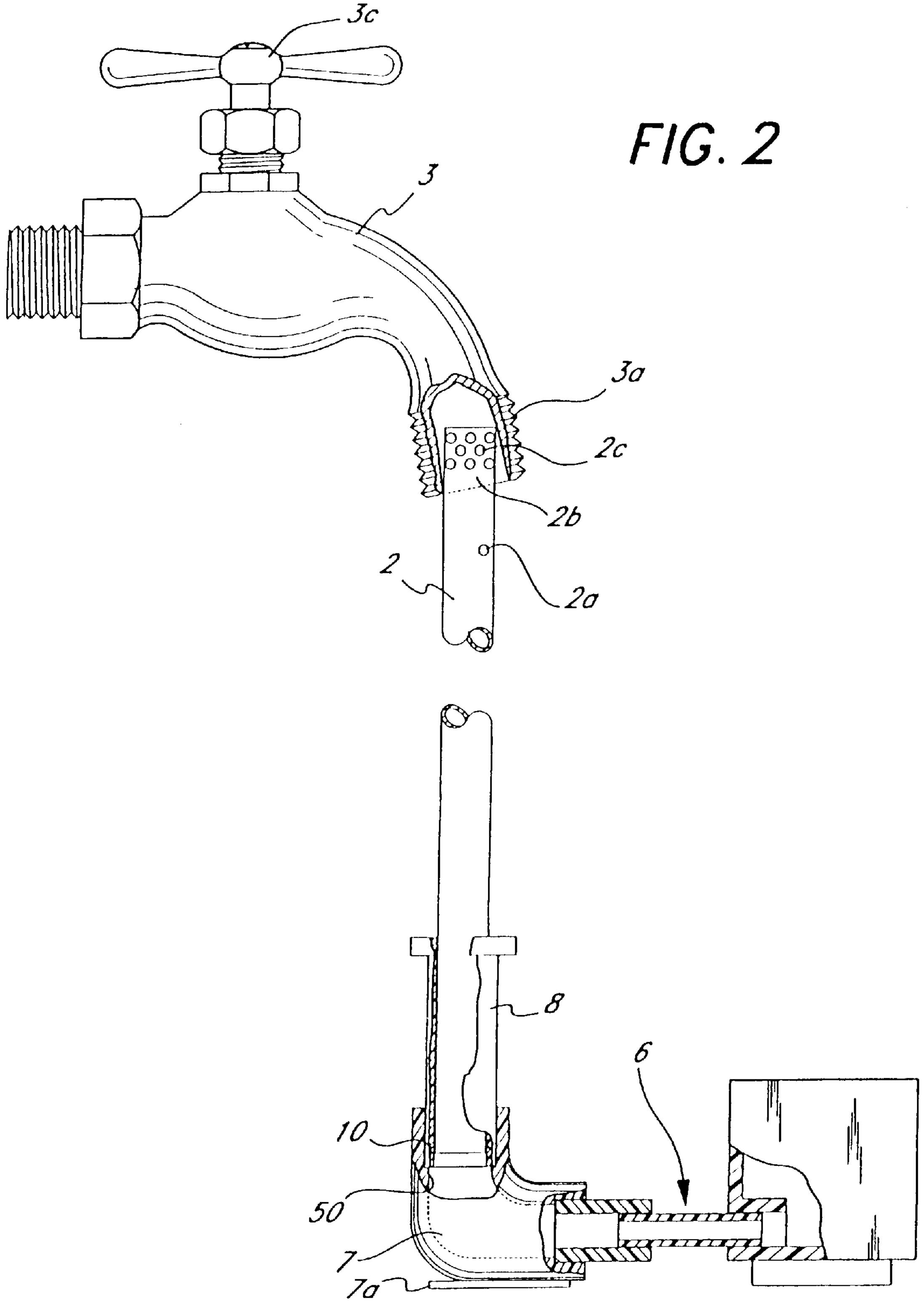
FIG. 2 is a side elevational view, with sections broken away, of the pump, support member, and faucet of the first embodiment of the novel fountain of this invention.

As best illustrated in FIG. 2, the elbow 7 has two flanges 7*a* protruding from each side of the base of elbow 7 which act as feet to support the elbow 7 on the bottom 1*d* of the container 1. Epoxy adhesive 9 is put on these flanges 7*a* of elbow 7 and then placed in the bottom 1*d* of water container 1*d* to form a permanent bond. The elbow 7 is constructed in a 90° configuration. One end of the elbow 7 has a slip fitting for the pipe 6 which is slipped into position and glued permanently. The other end of the pipe 6 is glued into the pump 4. The pump 4, pipe 6, and elbow 7 become one permanent part inside of container 1. The other end of the elbow 7 is a ½" natural pipe threaded female fitting. Inside of this female fitting is a ledge 50 upon which an O-ring 10 is placed. A riser 8 has a ½" natural pipe threaded male end, which is turned clockwise in FIG. 2 into elbow 7. The bottom of the riser 8 comes into contact with the O-ring 10. The pressure of this contact causes the O-ring 10 to expand and the inside diameter of the O-ring 10 becomes smaller.

The transparent rigid plastic tube 2 is slipped down the inside of riser 8 and snapped into the O-ring 10 inside of elbow 7. The plastic tube 2 is positioned inside of riser 8 in the center of the O-ring 10. As the riser 8 is turned clockwise as shown in FIG. 2, the O-ring 10 tightens around the tube 2, resulting in a secure fit and locking the tube 2 in place when the riser 8 is turned clockwise in FIG. 2 into the elbow 7. The O-ring 10 expands against the sides of the tube 2 and holds it firmly in place. The riser 8 thus becomes added support for the plastic tube 2. This union creates a path for water to flow from the pump 4 through the elbow 7 and up the inside of the rigid plastic tube 2.

As best illustrated in FIGS. 1 and 2, the lose bib/faucet 3 is connected on the top or free end 2*c* of the plastic tube 2, and optionally the beak 12*a* of a hummingbird statuette 12 is slipped into clear rigid plastic tubing 2 in a predrilled hole 2*a*. The rigid plastic tube 2 has holes 2*b* drilled in the upper free end 2*c* around the circumference of the clear rigid plastic tube. These holes 2*b* allow water to exit the tube 2 at a uniform flow rate and flow downward over the exterior surface 2*d* of the tube 2. This downward flow of water over the exterior surface of the tube 2 conceals the clear rigid plastic tube from viewing on all sides.

As will be appreciated from the above description, the elbow 7 and pump 4 combination at bottom 1*d* of the water container 1 are hidden below the nominal water level of water retained in the container. This combination provides the means for propelling water from the inside of the container 1 through the inside of the clear rigid plastic tube 2. When the upward flow of water in the inside of the tube reaches the free end 2*c* of the clear rigid plastic tube 2, it is forced out of the holes 2*b* into the mouth 3*a* of the hose bib/faucet 3. A valve (not shown) of the hose bib/faucet 3 should be closed by turning the knob 3*c*, however, a hose bib/faucet without an operable valve may also be used. With its valve closed, the hose bib/faucet 3 redirects the flow of water downward over the exterior of the clear rigid plastic tube 2 in a uniform 360° pattern to completely conceal the clear rigid plastic tube 2 from sight. This concealment creates the illusion of water flowing from the mid air suspended faucet 3 into the interior of the water container 1. The faucet 3 thus appears to have an endless supply of water with no apparent source to draw from as it is hanging in mid air. When the water is flowing over the exterior surface of the tube 2, the attachment mechanism of the beak 12*a* of the hummingbird statuette 12 is not detectable, thus resulting in the illusion of a bird drinking from the flowing water as the bird hovers in mid-air below the hose bib/faucet 3.

Second Embodiment

Figure 3:
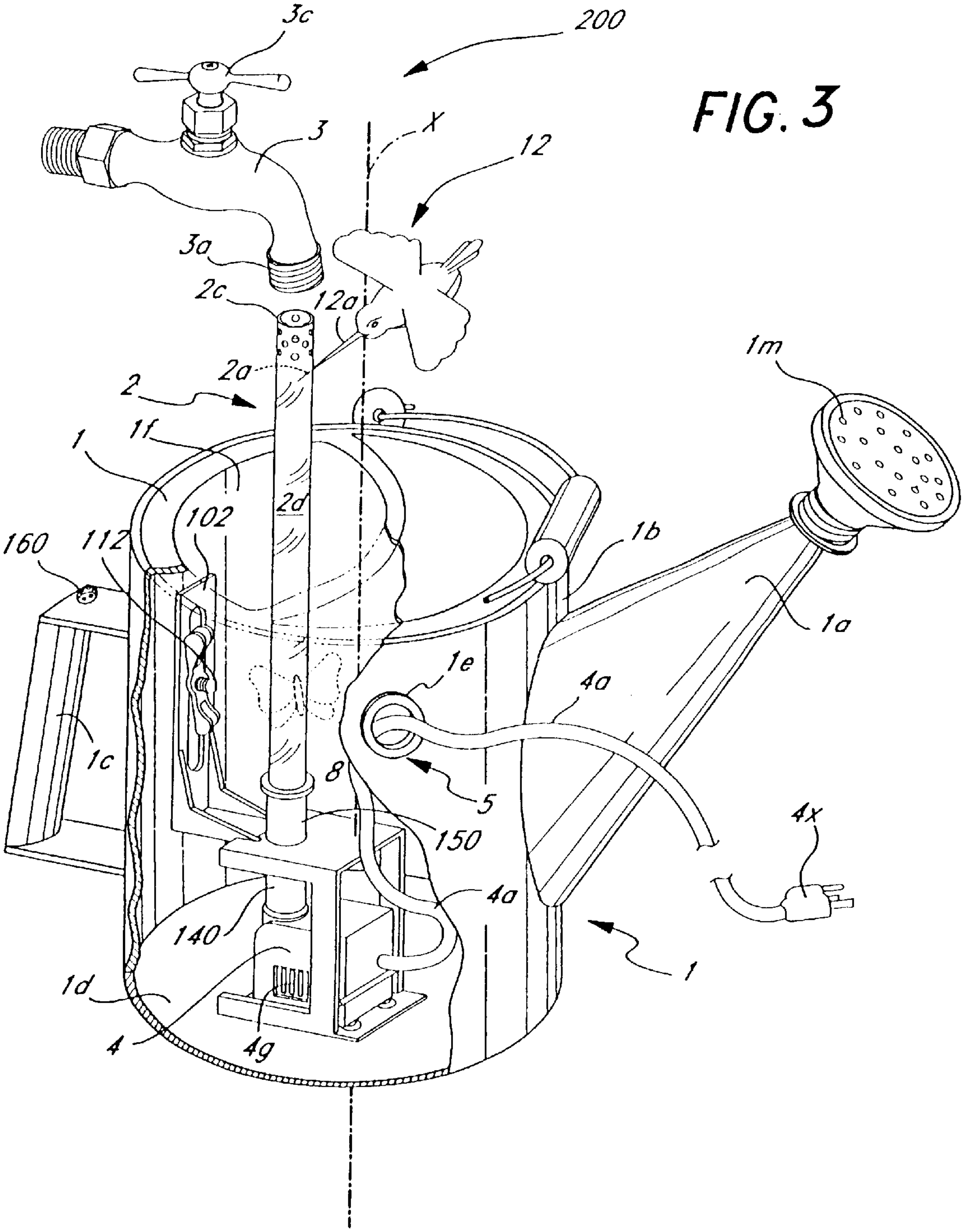
FIG. 3 is a perspective view, with sections broken away, of the second embodiment of the novel fountain of this invention.
Figure 4:
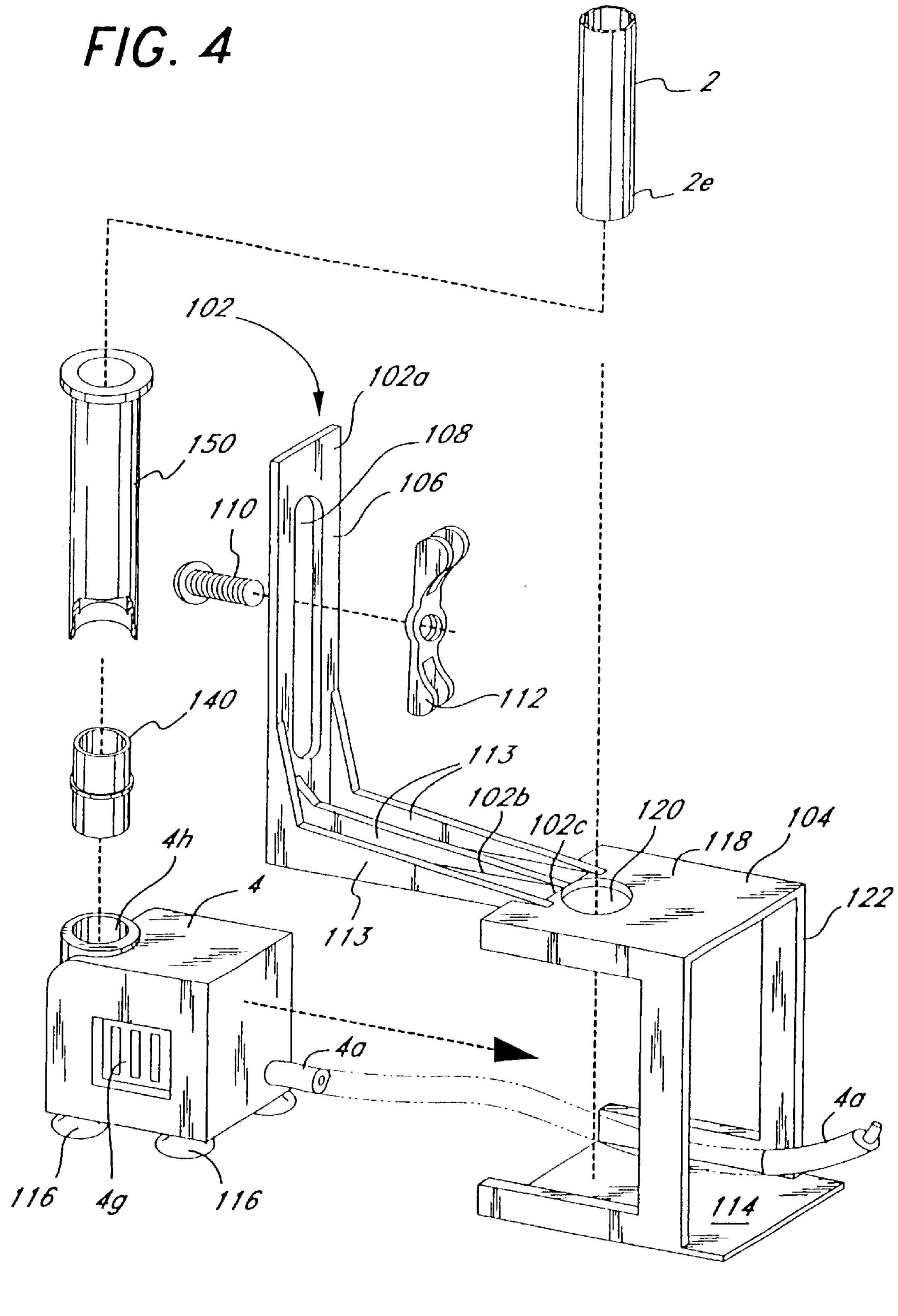
FIG. 4 is an exploded perspective view of the bracket and pump assembly to be mounted to the side wall of the water container used in the second embodiment of the novel fountain of this invention shown in FIG 3.
Figure 5:
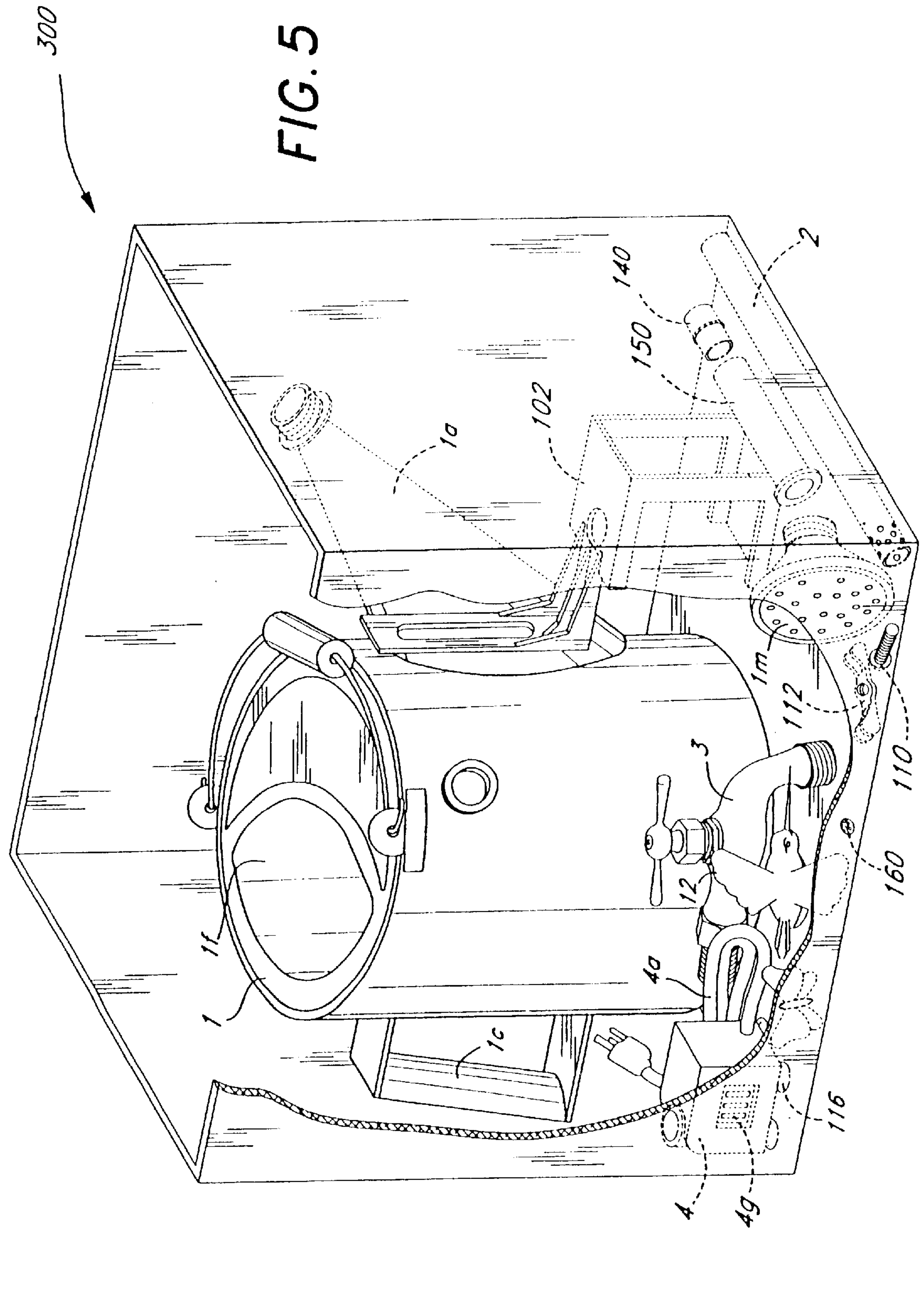
FIG. 5 is a kit holding all the components of the second embodiment ready to be assembled into the novel fountain of this invention as shown in FIG. 3.

The second embodiment of this invention, the fountain 200, as best depicted in FIG. 3, is similar in many ways to the first embodiment, fountain 100. This fountain 200 comes in a package 300 as shown in FIG. 5 either partially preassembled or completely disassembled. Its components are unpacked from the package 300 and conveniently, manually assembled by a user to make the fountain 200. These components include the container 1, which has a detachable head 1 m adapted to be connected to the spout 1*a*, the hose bib/faucet 3, the pump 4, the hummingbird statuette 12, and the tube 2, which are components common to the first embodiment, the fountain 100. Optionally, a statuette 160 of an insect such as a lady bug or butterfly may be attached to the exterior of the container 1. Additional components include a bracket 102, an adapter 140, a coupling pipe 150, a bolt 110 , and a wing nut 112.

The bracket 102 is used to suspend the pump 4 above the bottom 1*d* of the container 1, typically with the pump's inlet 4*g* is about ⅛ inch above the bottom 1*d*. This is important to prevent debris, which collects on the bottom 1*d*, from being drawn into the inlet 4*g* of the pump. As best shown in FIGS. 4, 4A, 4B, and FIGS. 6 through 8, the bracket 102 has a U-shaped member 104 integral with an offset L-shaped arm 106. This arm 106 has in its vertical leg 102*a* an elongated slot 108 that enables the bracket 102 to be removably attached to the side wall 1*b* of the container 1 by the bolt 110 and wing nut 112. A horizontal leg 102*b* of the arm 106 has a connecting edge portion 102*c* which is integral with an edge of one horizontal arm 118 of the U-shaped member 104. This horizontal arm 118 has an opening 120 therein for the tube 2. There are reinforcing elements 113 connected between the leg 118 and the arm 104*a* which assist in securing the L-shaped arm 106 to the U-shaped member 104 to prevent breakage along the line of connection (the connecting edge portion 102*c*) between the arm and U-shaped member. This U-shaped member 104 has a second arm which serves as a bottom platform 114 for the pump 4, and an open bridge member 122 connects the arm 118 and platform 114. The platform 114 supports the pump 4 and there are suction cup feet 116 on the underside of the pump which removably attach the pump to the platform. With the bracket 102 attached to the side wall 1*b*, the end 114*a* of the platform 114 is spaced from this side wall, typically from about 2 to about 4 inches. This reduces any vibrating or humming noise from the pump 4 which would otherwise result if this end 114*a* abutted the side wall 1*b*.

As best shown in FIG. 4B, the lower end 2*e* of the tube 2 is inserted into the upper end of the coupling pipe 150, and the lower end of the coupling pipe is inserted through the opening 120 into the adapter 140, which has an external, circumferential central lip 140*a*. The lower end of the adapter 140 is inserted manually into an outlet 4*h* of the pump 4. The lip 140*a* acts as a stop which limits the movement of the adapter into the outlet 4*h*. There is an internal, circular ring 150*a* integral with the inside of the coupling pipe 150 which acts as a stop for both the adapter 140 and the lower end 2*e* of the tube 2. After the assembly of the tube 2, coupling pipe 150, and adapter 140 are inserted into the outlet 4*h*, energization of the pump results in water in the interior of the container being drawn into the inlet 4*g*, pumped out the outlet 4*h*, and up though a passageway formed by this assembly and out the end 2*c* of the tube. With the hose bib/faucet 3 connected to the end 2*c* as discussed above, the water exits this end 2*c* and is directed, at least in part, by the hose bib/faucet 3 downward over the exterior surface 2*d* of the tube 2. The coupling pipe 150 includes the rim 150*b* which extends outward and intercepts the water flowing down the exterior surface 2*d* of the tube 2 and directs this water outward towards the inside of the wall 1*b* of the container 1. This redirected water either strikes the inside of the wall 1*b* or falls into the water in the container 1, creating a very pleasant tinkling sound.

To assemble the fountain 200, first unpack all components in the package 300. Remove a tie (not shown) from the cord 4*a* folded inside the watering container 1. The outside of the watering container 1 has the hole 1*e* from which a plug 4*x* emerges. Carefully pull the cord 4*a* so as not to interfere with internal parts to the desired length in order to reach an electrical outlet. Do not plug it into the outlet at this time. Any excess cord can be stored inside the watering container.

Fill the watering container 1 with water approximately halfway up the side of the bracket 102, making sure to totally submerse the pump 4. A one gallon bottle of drinking water is recommended. Do not fill above the bolt 110. The lower the water level in the fountain 200, the higher the volume of "tinkling noise" from the falling water. Keep the water level above the pump at all times.

Insert the tube 2 into the coupling pipe 150 so that it is straight and substantially parallel to the longitudinal axis X of the container 1. In the type of watering can depicted, the opening 1*f* in the top has a central point A laterally displaced with respect to a longitudinal axis X of the container, and the tube 2 intersects this central point. The tube 2 can be straightened by sliding the pump 4 backwards, forwards and sideways inside the U-shaped member 104. The pump's suction cup feet 116 grip tightly and can be difficult to slide. If grip is too firm, raise the pump slightly to loosen the suction cup feet and then reposition as needed to straighten the tube 2.

The hole 2*a* is approximately 2 inches from the top of the tube 2. This hole 2*a* is drilled at an angle downward into the tube 2. Hold the hummingbird statuette 12 by its beak and place the beak into the downward angled hole 2*a* so that the tail of the hummingbird is higher than the beak. If the body of the hummingbird statuette 12 is below the level of the hole, water will run down the beak and onto the body. This will damage the hummingbird statuette 12 and cause water to flow onto the floor. When removing statuette 12, maintain this angle so as not to enlarge hole 2*a*. An extra tube may be included without a bird hole for outdoor use, because the statuette 12 usually are too delicate for outdoor areas where sun, wind or rain can damage them.

Making sure the knob 3*c* is turned to close the valve in the hose bib/faucet 3, place the faucet on top of the tube 2 and position it so that it is opposite the hummingbird. A slight downward pressure is needed to seat the faucet onto the top of the tube.

Insert the plug 4*x* of the cord 4 into an electrical outlet (not shown). Water will appear to flow from the hose bib/faucet 3. Adjust the faucet so that the flow of water is uniform around the exterior of the tube 2. If the flow of water is not uniform around the tube 2, move the hose bib/faucet 3 angle slightly up or down, left or right, until the water flow is completely covering the tube 2. If the flow is still not correct twist the tube 2 a ¼ turn and readjust it. The cord should have some slack so it drapes slightly below the electrical outlet. Always use a grounded electrical outlet. If you do not have this type of outlet, use an electrical adapter between the outlet and plug.

Periodically empty and rinse the container 1 with warm water to prevent cloudy water due to mineral build up. Constant topping off will cause excessive mineral build-up as evaporation occurs. After the first five days of use empty the water, rinse and refill in order to wash out mineral leaching from "newness" and always replace with fresh water at first sign of cloudiness.

To prevent damage, do not let the pump run dry. Always remove the hose bib/faucet 3 when you move the fountain 200. Water quality varies in different geographic locations. Use of water with a high mineral content hard water may present problems. One gallon of bottled drinking water is recommended and will greatly reduce necessary cleaning. Do not use distilled water, since it will leach material from metal containers 1.

Alternate Kit

Figure 9:
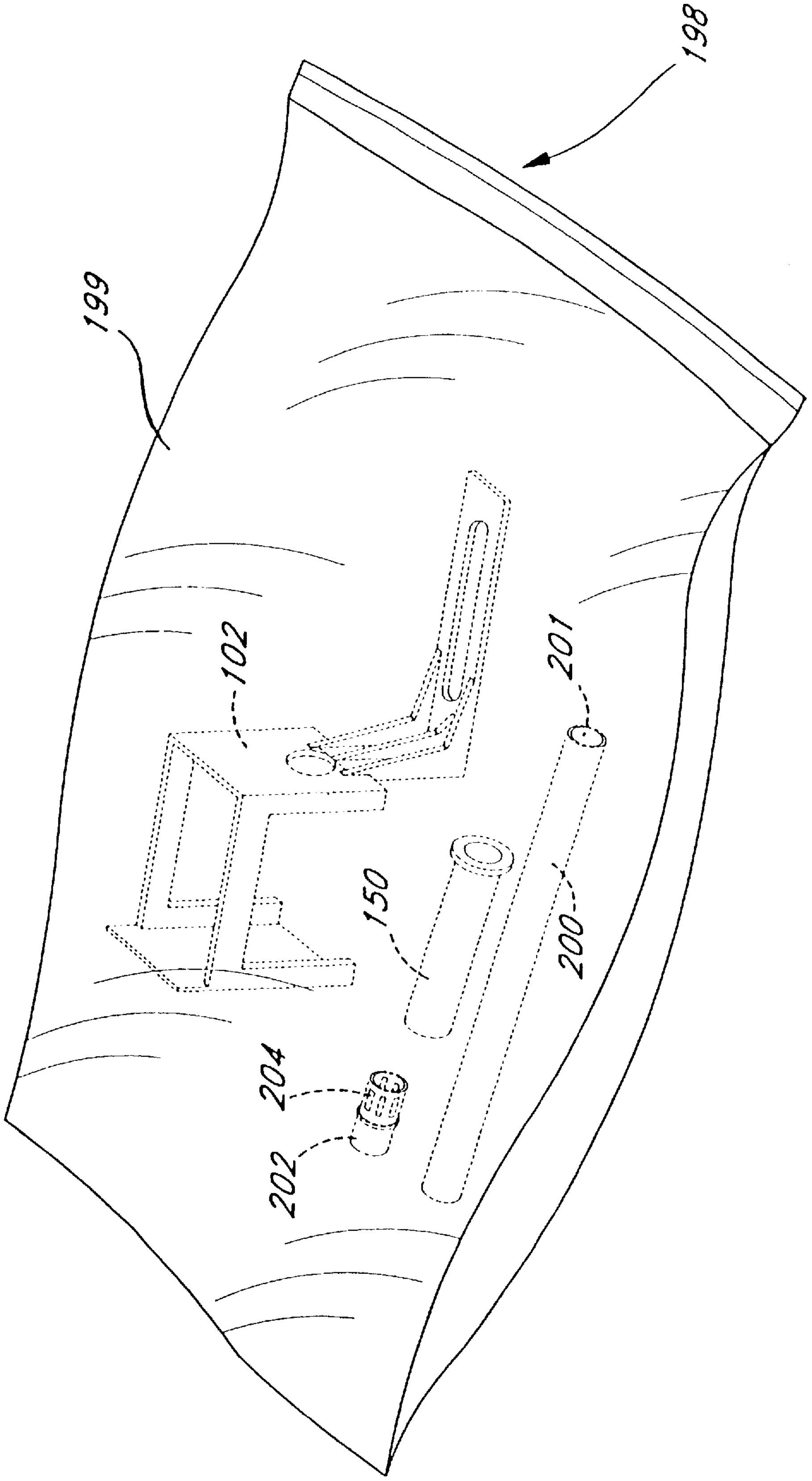
FIG. 9 is an alternate kit in accordance with this invention.

FIG. 9 depicts an alternate kit 198 which includes substantially fewer components than the kit shown in FIG. 5. At the minimum the alternate kit 198 includes a package 199 holding the bracket 102 and the support member 2, or as illustrated, a support member 200 which does not have holes 2*b* drilled in the upper free end of the support member. Rather, a tubular piece 202 with slits 204 is included. This tubular piece 202 is adapted to fit snug in the free end 201 of the support member 200 with the slits 204 serving to allow water or other liquid to flow therefrom. Preferably, this kit 198 also includes the coupling pipe 150. Since the water container 1, hose bib/faucet 3, and pump 4 are readily available, the user may purchase these at most any hardware store and assemble them with the components in the kit 198 as discussed above to provide the fountain of this invention.

Summary

In summary, the novel fountains 100 and 200 of this invention include the water container which has an open top, a side wall, a bottom, and a hollow interior which is water tight and adapted to hold water or other liquid. An elongated, hollow support member is positioned within the hollow interior of the container and extends from the container's open top. The support member has one end either fixedly or detachably mounted to or near the bottom of the container and a free end terminating a predetermined distance above the open top. This distance typically is from about 3.5 to about 4.5 inches. The support member preferably is a tube made of a light transmitting material and may be either a transparent or translucent plastic material, and it preferably has a smooth outer surface.

A water submersible pump is positioned within the interior of the container below the nominal water level and is operably connected to the one end of the support member mounted near or at the bottom of the container. A power cord from the pump passes through an opening in the side wall of the container located above the water level. The water in the interior of the container is pumped into and through the hollow support member. This water flows out the free end of the support member terminating above the open top and then along the outer surface of the support member to return to the interior of the container.

A faucet is attached to the free end of the support member in a manner that allows the water to flow from this free end downward over the outer surface of the support member. This creates the illusion of water flowing from the faucet. A statuette of a bird with its pointed beak is attached to a portion of the support member extending from the open top of the container. Thus, it appears as if a bird is in mid-air and drinking from the flowing water. This statuette is about 2.5 to about 3.5 inches in length and is light weight, having a weight of from about ¼ to about ¾ ounces.

Upon activation of the pump, water travels upward through the inside of the support member and upon reaching the top of the support member, the water is redirected back down the outer surface of the support member by the faucet. The pump then recycles the water.

Scope of the Invention

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

What is claimed is:

1. A bracket including a substantially L-shaped arm with a first leg having an elongated opening therein and a second leg substantially at a right angle to the first leg which terminates at a connecting portion, a substantially U-shaped support member having a first arm with an opening therein for a tubular support member and terminating in a connecting section which is integral with the connecting portion of the second leg, a second arm adapted to support a submersible pump, and a bridge member connecting the first and second arms, and a tubular coupling member extending through said opening in the first arm of the U-shaped support member.

2. The bracket of claim 1 where the bridge member is open.

3. The bracket of claim 1 including at least one reinforcing element extending between and connected to the first leg of the L-shaped arm and the first arm of the U-shaped support member.

4. The bracket of claim 1 where the tubular coupling member has a rim element.

* * * * *